(12) United States Patent
Harness

(10) Patent No.: US 6,623,814 B2
(45) Date of Patent: Sep. 23, 2003

(54) INTERLOCKING DETACHABLE LEGS FOR TAXIDERMY FORMS

(76) Inventor: Brian Harness, 2536 Prairieview, Harrison, AR (US) 72601

( * ) Notice: Subject to any disclaimer, the term of this patent is extended or adjusted under 35 U.S.C. 154(b) by 0 days.

(21) Appl. No.: 09/815,639

(22) Filed: Mar. 23, 2001

(65) Prior Publication Data

US 2002/0176948 A1 Nov. 28, 2002

(51) Int. Cl.⁷ .................................................. A01N 1/00
(52) U.S. Cl. ............................ 428/16; 428/15; 428/39; 428/542.2; 434/295; 434/296
(58) Field of Search .............................. 428/16, 15, 39, 428/542.2; 446/268, 337, 390, 385, 100, 101, 69; 434/295, 296, 297

(56) References Cited

U.S. PATENT DOCUMENTS 5,983,552 A * 11/1999 Nelson ............................ 43/2

OTHER PUBLICATIONS

Van Dyke's catalog (copyrighted 2001/2002), on p. 73 reference numerals "F" through "H," and on p. 74 reference numerals "N" and "P." (Woonsocket, South Dakota). No Date.

* cited by examiner

Primary Examiner—Deborah Jones
Assistant Examiner—Abraham Bahta
(74) Attorney, Agent, or Firm—Jonathan A. Bay

(57) ABSTRACT

An assembly (10 and 12), the construction of which makes up a taxidermy core or form for small mammals, has a limbless main body (10) and attachable/detachable locking legs (12). Locking is predominantly achieved by a male post (14) inserting inside a female receptive lock (16). When the specimen animal is being mounted, the assembly's parts (10 and 12) are serially slid in through the taxidermist's working opening in the sock-like skin, the succession in general being forelimbs (12) first, then rear limbs (12) or the main body (10). The parts (10 and 12) once slid inside can be shifted about until the male posts (14) and the female receptive locks (16) are engaged. The positional stability of the legs (12) relative to the main body (10) is enhanced by a body key (18).

20 Claims, 3 Drawing Sheets

INTERLOCKING DETACHABLE LEGS FOR TAXIDERMY FORMS

BACKGROUND AND SUMMARY OF THE INVENTION

This invention relates to accessories and processes for taxidermy and, more particularly, to small mammal polyurethane forms used in taxidermy. Briefly, a form is the core over which an animal skin is stretched and/or mounted when a taxidermist creates a work of taxidermy art, ie., a mounted animal skin. As more particularly described below, during the taxidermy process the skin is carefully prepared to be something like a sock, and after that is slid over an appropriately-sized and -shaped form as comparably as a sock slides onto a foot.

Taxidermists have been using polyurethane forms in the process of mounting small mammals for decades. The prior art forms have changed very little during this time.

Originally, the taxidermist made his form from excelsior until polyurethane came along. Forms produced by casting polyurethane were a great improvement over forms produced by hand wrapping excelsior. Later, the Van Dyke Company of Woonsocket, S. Dak., made a few forms with separate legs that did not lock into the form. As more particularly described below, the separate legs or limbs got fastened to the limbless body by bolts. These were very difficult to use. All of these models present many disadvantages to the taxidermists in part as follows.

By way of background, polyurethane forms are typically cast around reinforcing support wires in molds made of fiberglass. Generally the hardened polyurethane form is difficult to get out of the mold without breaking the legs of the form because of the polyurethane foam being inherently weak and brittle. To accommodate this most form manufacturers produce a one-piece whole animal form with an oversized leg to reduce breakage. The oversized leg makes it difficult for the end-user of the form, the taxidermist, to get the skin over the form unless the taxidermist rasps down the size of the leg.

The depth of the area between the legs on a one-piece whole animal form is typically too thick because the mold cannot be made correctly in this area. This can be reckoned as an unnatural web in the crotch of the rear limbs or the armpit areas of the forelimbs. Because of this, the skin of the mammal will not fit the form without alterations. For example, to get a proper fit in the armpit area, the taxidermist must cut slots in the form for the skin to slide up into this area. Many times the leg support wires are in this area which makes it very difficult to cut these slots.

Many of the one-piece whole animal forms are in poses that require the taxidermist to cut apart before the skin will fit on the form. After the skin is stretched on the cut-apart pieces of the form, the cut-apart pieces must be glued back together, which is very difficult.

Most taxidermist use an incision commonly known as a dorsal incision in the skinning of mammals. This incision is made along the back of the animal starting at the base of the tail and going to the base of the skull. This incision is required for most mounts which results in a 24"–30"(60 to 75 cm) incision that requires a lot of sewing time and makes it hard to conceal the seam.

Shipping a one-piece whole mammal form is expensive because of the space one form takes up because of the legs. Even though the form may only weigh 4 pounds, because of its bulk, it must be shipped as an oversized package which common carriers charge as a 30 pound package. Damage often occurs to the form when shipping because the legs are hard to pack around being attached to the form and sticking out.

To turn attention now to the prior art form assemblies available as separate limbs and limbless bodies, while these forms do provide separate legs, the legs do not lock into the legless body but instead are provided with a bolt to attach the leg. It is very difficult to attach the legs in this manner because the taxidermist has to work under the skin to tighten the bolt. Also, forms with separate legs are very unstable with the bolt system because the bolt will cut into the form as the taxidermist tightens the bolt. A taxidermist can never get the leg tight all the way. Additionally, the bolt head will be seen protruding from the form and thus be seen sticking out under the skin of the mammal. Moreover, without a locking system, these prior art type assembly forms make the taxidermist guess the proper location of each leg.

Finally, the prior art bolting system restricts the freedom of a form manufacturer to obtain many life-like action poses with the form. That is, the bolting system works best when bolt inserts through aligned holes that make a passage extending at right angles to the axis of the spine. As a consequence, for example in the forelimbs, the shoulder blades are constrained to be disposed more or less flanking the spine opposite each other, eg., on a right-angle transverse axis. However, in real life and with the cat family in particular, some mammals are very supple. They are capable of slinking in ways in which a leading shoulder blade is far offset in front of and dipped or raised at a very different elevation from the trailing shoulder blade. Given the foregoing, the prior art bolting system is deficient in allowing a form manufacturer to produce a wide variety of desirable poses that better show an animal off in its most contorted and fantastic position.

In order to overcome the shortcomings of the prior art, it is an object of the invention to provide a taxidermy form assembly which has advantageously-configured interlocking attachable/detachable legs.

It is an alternate object of the invention to provide a form that has the correct size leg which does not require any rasping to make the leg fit the skin.

It is another object of the invention to provide a form that is accurate between the legs.

It is an additional object of the invention to provide a form that already has the armpit and/or crotch slots molded into the form.

It is an alternative object of the invention to provide a form with more life-like action poses than attainable by the one-piece whole animal prior art forms, or at least that does not have to be cut apart to get the skin on the form.

It is a further object of the invention to provide a form which allows the taxidermist to use either a short 8" (20 cm) dorsal incision or 8" belly incision.

It is yet another object of the invention to provide a form that can be shipped for less cost.

It is yet an additional object of the invention to provide a form that will incur fewer damages in shipping.

It is yet a further object of the invention to provide a form with attachable/detachable legs that lock into the main body for producing a stable whole-figure form.

It is moreover another object of the invention to provide a form with attachable/detachable legs that lock into the main body without the use of bolts.

It is moreover a further object of the invention to provide a form with detachable legs that have a positive and accurate seat between the leg(s) and main body.

Further objects and advantages are provided in accordance with the invention by a form which is anatomically correct in and around the leg area, which provides a skin slot for the armpit and/or crotch skin to slide into, which allows the manufacturing of a more accurate and life-like pose, with the ability to shorten the incision by one-third (⅓) the normal length, which will allow the taxidermist more freedom in the location of the incision, which will save money and prevent damages in shipping, which simply locks into the main body without any bolts, which is stable, and which keys in perfectly to the main body.

Additional features and objects will be apparent in connection with the following disclosure of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
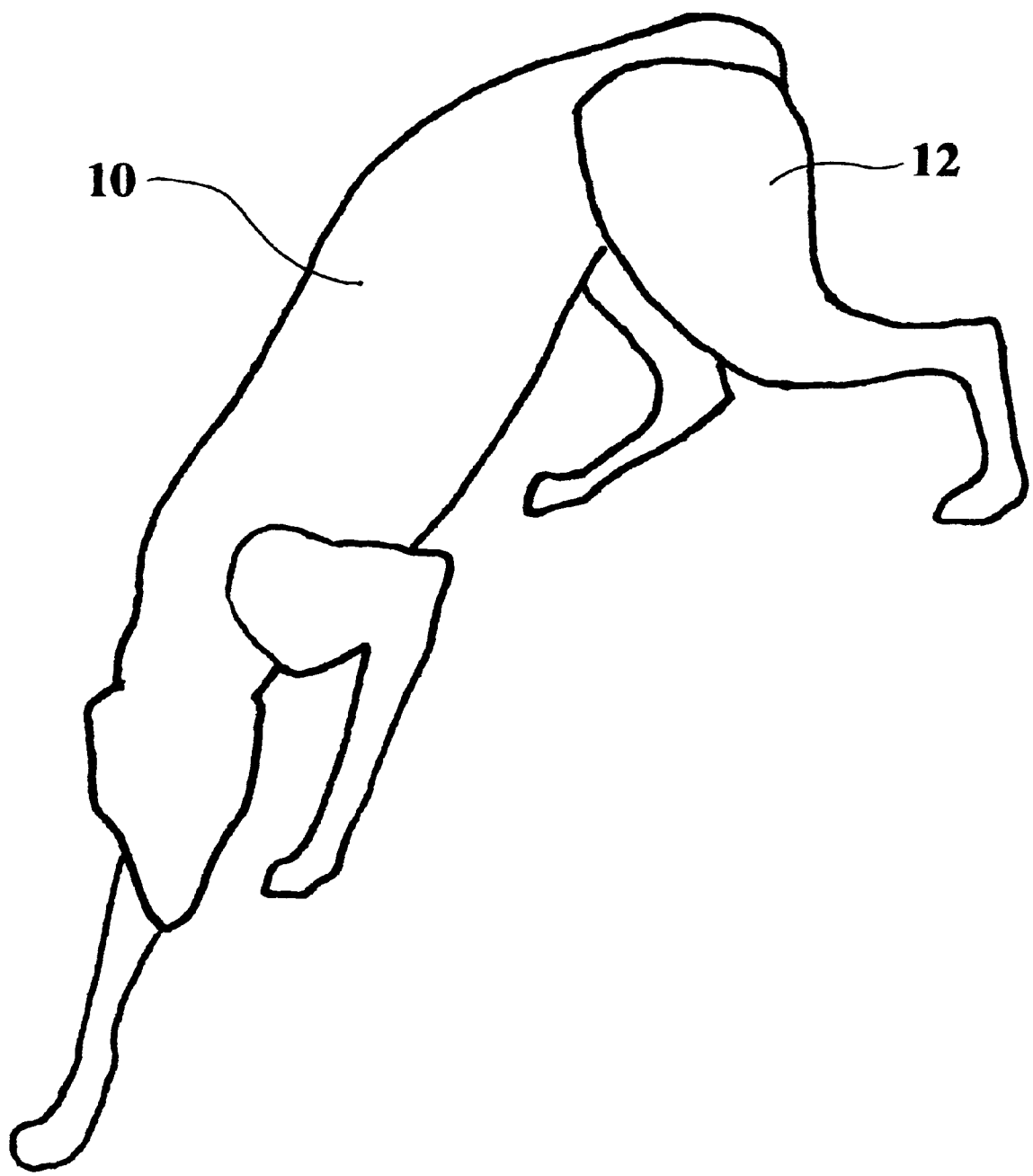
FIG. 1 is a perspective view of a taxidermy form having interlocking attachable/detachable limbs in accordance with the invention.
Figure 2A:
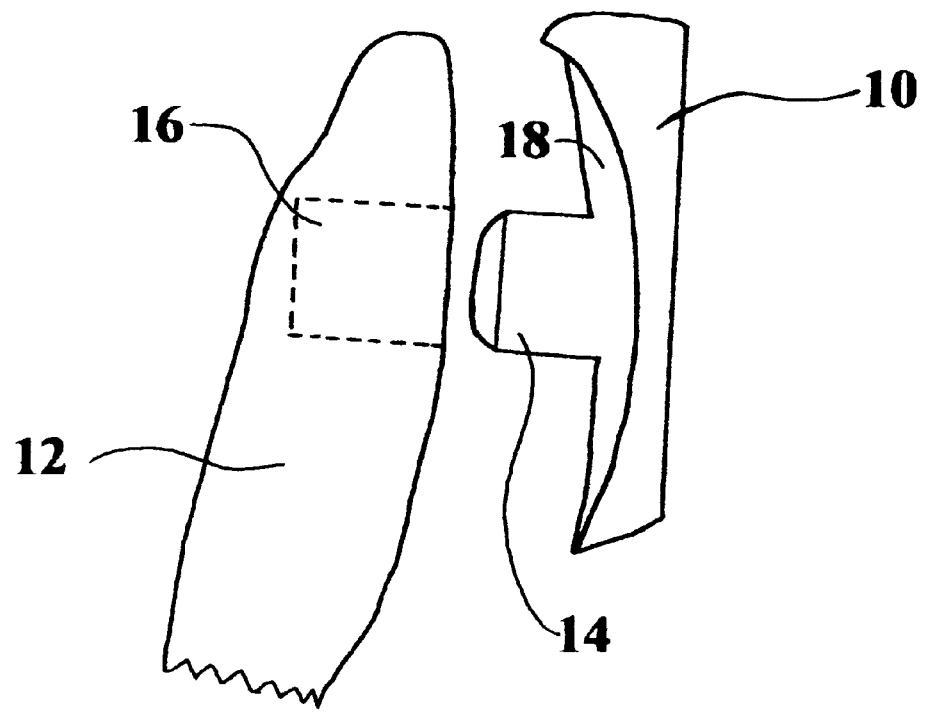
FIG. 2A is an enlarged-scale rear-elevational view of a detail from FIG. 1, as isolating on the attachment of the left rear leg, wherein other portions broken away.
Figure 2B:
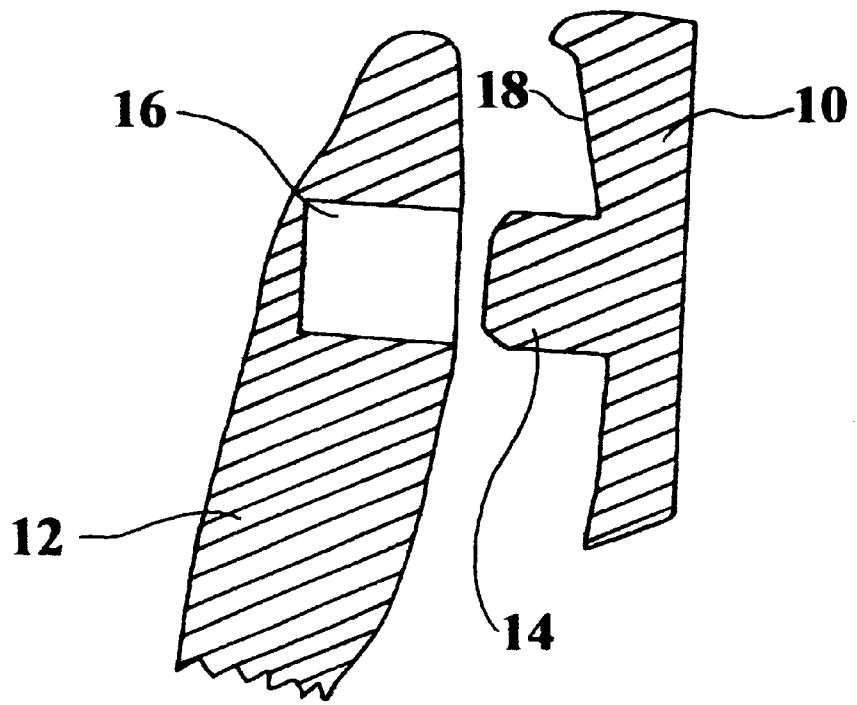
FIG. 2B is a sectional view of FIG. 2A.
Figure 3:
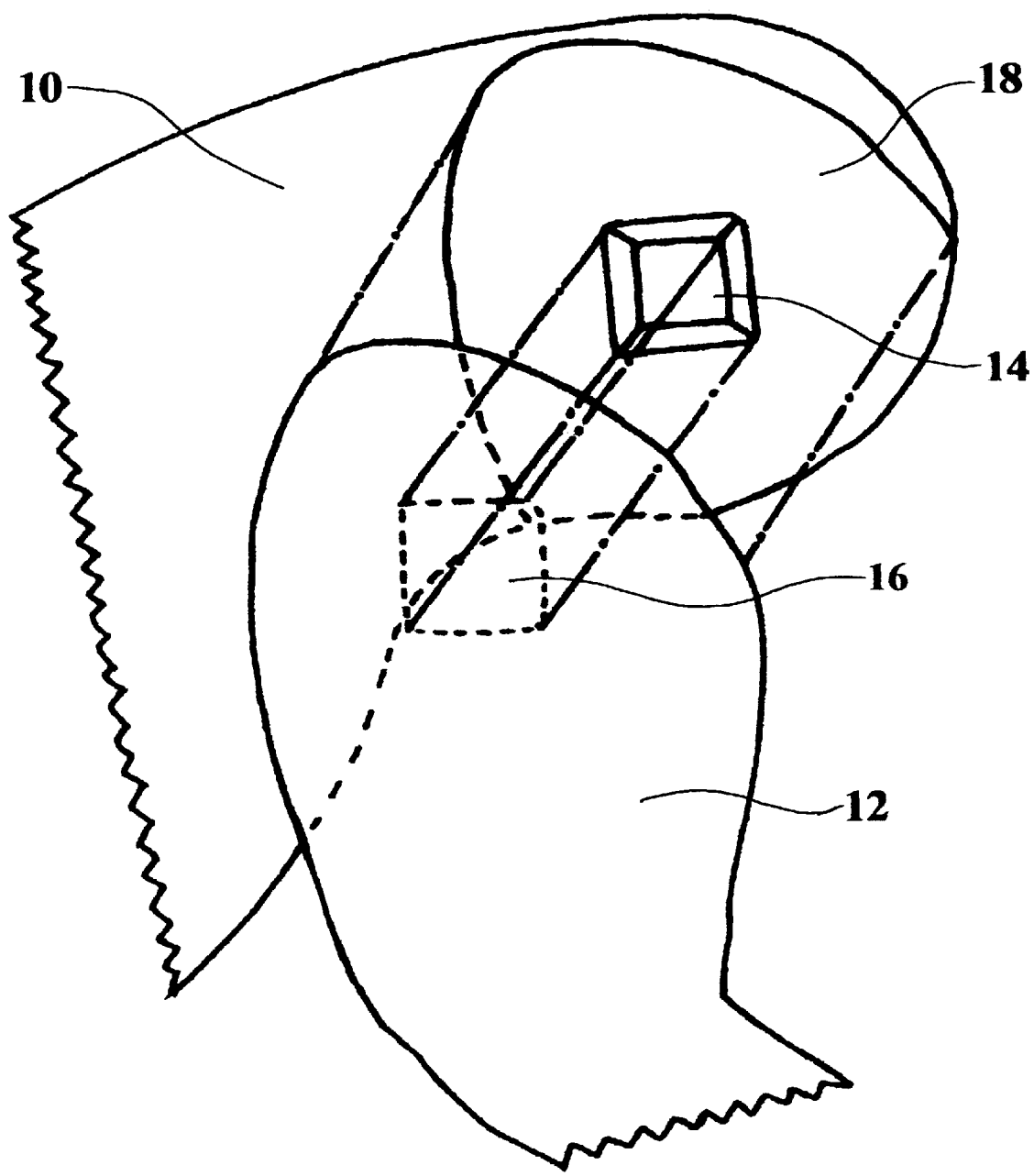
FIG. 3 is an enlarged scale perspective view comparable to FIG. 1 except isolating on the attachment of the left rear leg, shown detached from the main body but aligned for attachment, and with other portions broken away.

A preferred embodiment of a taxidermy form 10 and 12 having interlocking attachable/detachable legs or limbs 12 in accordance with the invention is illustrated in FIG. 1 (all legs connected), FIG. 2A (rear view), FIG. 2B (cross section of FIG. 2A), and FIG. 3 (an exploded pictorial view). All legs 12 lock into the main body 10 in the same manner. Therefore, only the left rear leg (eg., indicated as reference numeral 12 in FIGS. 2A, 2B and 3) will be discussed and shown.

The left rear leg 12 locks into the main body 10 by means of a male post 14 going into a female leg lock 16. The end of the male post 14 is either chamfered at 45 degree angles on all sides or is rounded on the end to make insertion into the lock 16 easier. The post 14 is usually one-half to one inch (1.25 cm. to 2.5 cm.) long. The depth of the lock 16 is about one-eighth an inch (0.3 cm.) more than how far in the respective post 14 will insert. This ensures a positive seat with the body key 18. The size of the lock 16 and post 14 are dependent on the size of the form 10 and 12 for which it is made. For example, a mink size form would use about a three-fourths inch (1.87 cm.) square size lock 16 and post 14, and fox and bobcat size forms would use about one-inch (2.5 cm.) square lock 16 and post 14. The post 14 and lock 16 must be the same size to achieve a tight fit for the secure the interlocking of both parts. Post 14 may be made from polyurethane foam like the main body 10 or a wood post may be inserted into the mold during the foaming process. The body key 18 is an exact match for the leg 12 to seat into the body 10 giving even more stability to the lock.

There are various other shapes with regards to the post 14 and lock 16 that could be used. These could be a cylindrical or rectangular post 14 and lock 16 instead of the previously mentioned square post 14 and lock 16.

Given the foregoing, a number of advantages of the inventive interlocking leg system become evident.

With the small mammal legs 12 produced separate from the main body 10, the legs 12 can be produced in the correct size, saving the taxidermist time in getting the skin to fit the leg 12. That is, the taxidermist is saved the time of having to shave or rasp down oversized legs in order to obtain a size and shape that will insert inside the skin's leg socks as well as which will stretch the skin in accordance with a natural appearance.

By producing the legs 12 separate from the main body 10, the areas between the front legs and between the back legs will be the correct proportions to allow for proper fit of the skin over the form 10 and 12. In other words, the invention eliminates the problems of webbing that can occur in forelimb armpit and/or rear limb crotch areas. This will be especially helpful in the back legs because it will allow the incision to come together without excessive pulling and stretching of the skin.

The skin slot (eg., one or both armpit areas between the body form 10's mock rib cage and the insides of the upper forelimbs and/or one or both crotch areas between the body form 10's mock belly and the insides of the upper thighs) will be formed narrowly and deeply as by more predominantly recessing into the main body 10 (and while this can partly be discerned with the rear left leg in FIG. 2A or 2B, the narrowest and deepest slot in assembly 10 and 12 is better reckoned by reference to the left forelimb in FIG. 1). That way, especially in consideration of the left armpit area, this will allow the taxidermist to simply slide the armpit skin into this area without any modification or cutting.

The interlocking leg forms in accordance with the invention 10 and 12 will allow the taxidermist to use forms in any pose without having to cut the form to get the skin to go over the form. This will also allow the taxidermist to use forms 10 and 12 with more radical and lifelike poses which will generate more business for them.

The interlocking legs 12 will save the average taxidermist 30–60 minutes per animal in sewing the incision back together because the length of incision can be reduced by up to 75%.

The cost of shipping, damages, and packaging of these form assemblies 10 and 12 will be greatly reduced by saving time in packing requirements and bulk of the forms.

This locking system 14, 16 and 18 allows the taxidermist to simply push the legs 12 into the post 14 and the leg 12 is locked into the correct position producing a stable and accurate seat without the use of any tools or bolts.

The manner of using the interlocking leg small mammal form 10 and 12 is quite simple. After the skin is tanned by whichever means the taxidermist prefers, the taxidermist slips each leg 12 into the corresponding leg of the mammal's skin. Next, the main body 10 is slid into the main body skin. As the main body form 10 is inserted to the point of the front legs 12, each leg lock 16 is aligned with the post 14 of each corresponding side and are slid together locking the legs 12 into place in the body form 10 (eg., FIG. 3, although more accurately this view shows a rear limb). After this, the skin is pulled down to the back of the main body form 10 where the back legs 12 are locked into the form 10 in the same manner as the front (eg., FIG. 3). Finally, the short incision is sewn together and the final detail work is done.

In regards to the manufacturer's shipping of the interlocking leg forms 10 and 12, the shipper simply tapes the legs 12 together and then tapes the legs 12 to the main body 10. This will reduce the chance of the legs 12 getting broken in shipping and will also save money due to the reduction of the size of the corrugated box needed to contain the form assembly 10 and 12.

Given the foregoing, it can be readily seen that the interlocking leg small mammal form 10 and 12 can reduce the time that is normally required to mount a small mammal by reducing the length of the incision and eliminating the need to cut the form apart in order to get the skin to fit the form. In addition, this form 10 and 12 saves even more time by having the armpit skin slot (eg., this referring to one or both armpit areas between the chest and insides of the upper forelimbs and/or one or both crotch areas between the belly insides of the upper thighs) molded into the main body form 10. This eliminates any need for additional work in these areas and provides for a superior fit in the legs 12 and between the legs 12 which saves additional time and makes the mounting job easier. Furthermore, the post and lock system 14 and 16 provides a simple, yet effective means by which the legs 12 can be attached to the main body 10 in a stable and accurate manner. Finally, the interlocking legs 12 provide the manufacture with a small mammal form 10 and 12 which is easier to package, to produce, and cheaper to ship.

Although the description above contains specific examples, these should not be construed as limiting the scope of the invention but as merely providing illustrations of some of the present preferred embodiments of this invention. For example, the post and lock 14 and 16 can have other shapes such as circular, oval, rectangular, and so on, as well as other sizes.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An assembly, the construction of which makes up a taxidermy core or form for mounting the skin of a small mammal, comprising:
   a main body that lacks a plurality of limbs; and,
   a corresponding plurality of detached attachable limbs;
   wherein each of the plurality of detached attachable limbs extends between a body attachment end and a distal terminal end, which body attachment end comprises an integrally formed first docking formation that comprises one of a male post or a female socket;
   wherein the main body comprises a plurality of limb-attachment formations for each of the plurality of detached attachable limbs, of which each limb-attachment formation comprises an integrally formed second docking formation that comprises the other of a male post or a female socket for the respective first docking formation of the respective detached attachable limb;
   whereby the assembly can be constructed into a whole-animal taxidermy form by assembling together the detached attachable limbs with the main body inside a sock-like covering that is the skin of the specimen small-mammal to be mounted.

2. The assembly of claim 1 wherein:
   each second docking formation of the main body further includes a recessed contour partly or wholly surrounding the other of the male post or female socket, and,
   each detached attachable limb further includes a bulging contour partly or wholly surrounding said one of the male post or female socket,
   wherein said bulging contour mates flush with the respective recessed contour in only one preferred alignment between the main body and the respective attachable limb in order to ensure proper positional orientation and also enhance positional stability between said main body and attachable limbs.

3. The assembly of claim 1 wherein, given axial docking between a given first docking formation of one of a male post or female socket and second docking formation of the other of a male post and a female socket, said male post and female socket are formed in a given geometry that admits axial docking in only certain angular alignments.

4. The assembly of claim 3 wherein the male post and female socket are square or rectangular.

5. The assembly of claim 3 wherein:
   each second docking formation of the main body further includes a recessed contour partly or wholly surrounding the other of the male post or female socket, and,
   each detached attachable limb further includes a bulging contour partly or wholly surrounding said one of the male post or female socket,
   wherein said bulging contour mates flush with the respective recessed contour in only one preferred alignment between the main body and the respective attachable limb in order to ensure proper positional orientation and also enhance positional stability between said main body and attachable limbs.

6. The assembly of claim 1 wherein:
   at least one of said detached attachable limbs comprises a forelimb, and the respective limb-attachment formation corresponds to a left or right side of a mock rib cage of the specimen small-mammal to be mounted, wherein an area of said main body surrounding said respective limb-attachment portion in combination with said at least one attachable limb are cooperatively shaped and sized to form a narrow, deeply slotted mock armpit area.

7. The assembly of claim 1 wherein:
   said detached attachable limbs and said main body are produced from castings or moldings of polymer or resinous materials, and at least said detached attachable limbs are produced with skeletal reinforcing wire.

8. The assembly of claim 7 wherein:
   at least one of said detached attachable limbs comprises a forelimb, and the respective limb-attachment formation corresponds to a left or right side of a mock rib cage of the specimen small-mammal to be mounted, wherein an area of said main body surrounding said respective limb-attachment portion in combination with said at least one attachable limb are cooperatively shaped and sized to narrow, deeply slotted mock armpit area.

9. A method of taxidermy to produce mountings of small mammals, characterized by a taxidermist at some original time preparing a skin of the specimen to be mounted in the form of a sock-like covering having a main incision openable to a size not much larger than necessary to the largest size of a mock torso of the specimen to be mounted, comprising the steps of:

provided an assembly, the construction of which makes up a taxidermy core or form for mounting the skin of the specimen to be mounted, wherein said assembly comprises a main body that lacks a plurality of limbs; and, a corresponding plurality of detached attachable limbs;

wherein each of the plurality of detached attachable limbs extends between a body attachment end and a distal terminal end, which body attachment end comprises an integrally formed first docking formation that comprises one of a male post or a female socket;

wherein the main body comprises a plurality of limb-attachment formations for each of the plurality of detached attachable limbs, of which each limb-attachment formation comprises an integrally formed second docking formation that comprises the other of a male post or a female socket for the respective first docking formation of the respective detached attachable limb;

inserting the detachable limbs and main body into the sock-like covering that is the skin of the specimen to be mounted through the incision therein;

assembling together the detached attachable limbs with the main body within the sock-like covering that is the skin of the specimen to be mounted into a whole-animal taxidermy form; and, sewing the incision shut.

10. The method of claim 9 wherein:
each second docking formation of the main body further includes a recessed contour partly or wholly surrounding the other of the male post or female socket, and,
each detached attachable limb further includes a bulging contour partly or wholly surrounding said one of the male post or female socket,
wherein said bulging contour mates flush with the respective recessed contour in only one preferred alignment between the main body and the respective attachable limb in order to ensure proper positional orientation and also enhance positional stability between said main body and attachable limbs.

11. The method of claim 9 wherein, given axial docking between a given first docking formation of one of a male post or female socket and second docking formation of the other of a male post and a female socket, said male post and female socket are formed in a given geometry that admits axial docking in only certain angular alignments.

12. The method of claim 11 wherein the male post and female socket are square or rectangular.

13. The method of claim 11 wherein:
each second docking formation of the main body further includes a recessed contour partly or wholly surrounding the other of the male post or female socket, and,
each detached attachable limb further includes a bulging contour partly or wholly surrounding said one of the male post or female socket,
wherein said bulging contour mates flush with the respective recessed contour in only one preferred alignment between the main body and the respective attachable limb in order to ensure proper positional orientation and also enhance positional stability between said main body and attachable limbs.

14. The method of claim 9 wherein:
at least one of said detached attachable limbs comprises a forelimb, and the respective limb-attachment formation corresponds to a left or right side of a mock rib cage of the specimen small-mammal to be mounted, wherein an area of said main body surrounding said respective limb-attachment portion in combination with said at least one attachable limb are cooperatively shaped and sized to form a narrow, deeply slotted mock armpit area.

15. The method of claim 9 wherein:
said detached attachable limbs and said main body are produced from castings or moldings of polymer or resinous materials, and at least said detached attachable limbs are produced with skeletal reinforcing wire.

16. The method of claim 15 wherein:
at least one of said detached attachable limbs comprises a forelimb, and the respective limb-attachment formation corresponds to a left or right side of a mock rib cage of the specimen small-mammal to be mounted, wherein an area of said main body surrounding said respective limb-attachment portion in combination with said at least one attachable limb are cooperatively shaped and sized to narrow, deeply slotted mock armpit area.

17. A taxidermy assembly, the construction of which makes up a whole-animal form for mounting the skin of a specimen animal to be mounted, comprising:
a main body that lacks a major portion of a limb; and,
a detached attachable limb portion that corresponds to what the major body lacks;
wherein the detached attachable limb portion extends between a base-attachment end and a distal terminal end, which base-attachment end comprises an integrated first formation that comprises one of a male post or a female socket;
wherein the main body comprises a corresponding limb-attachment formation for the detached attachable limb portion, which limb-attachment formation includes an integrated second formation that comprises the other of a male post or a female socket for the respective first formation of the respective detached attachable limb;
whereby the assembly can be constructed into a whole-animal form by assembling together the detached attachable limb portion with the main body inside a sock-like covering that is the skin of the specimen animal to be mounted.

18. The taxidermy assembly of claim 17 wherein:
each second formation of the main body further includes a recessed contour partly or wholly surrounding the other of the male post or female socket, and,
each detached attachable limb further includes a bulging contour partly or wholly surrounding said one of the male post or female socket,
wherein said bulging contour mates flush with the respective recessed contour in only one preferred alignment between the main body and the respective attachable limb in order to ensure proper positional orientation and also enhance positional stability between said main body and attachable limbs.

19. The taxidermy assembly of claim 17 wherein:
the base-attachment end of the detached attachable limb portion further includes a first complement formation, and
the limb-attachment formation of the main body further includes a second complement formation, and, wherein said first complement formation mates properly with said second complement formation in only one preferred alignment between the main body and the attachable limb portion in order to ensure proper positional orientation and also enhance positional stability between said main body and attachable limb portion.

20. The taxidermy assembly of claim 19 wherein:

said first complement formation comprises a bulging contour partly or wholly surrounding said one of the male post or female socket, and said second complement formation comprises a recessed contour partly or wholly surrounding the other of the male post or female socket, said first complement portion mates properly with said second complement formation in said only one preferred alignment between the main body and the attachable limb portion by virtue of said bulging contour mating flush with the respective recessed contour in said only one preferred alignment.

* * * * *